United States Patent [19]
Olmsted

[11] 3,968,813
[45] July 13, 1976

[54] FLOW SHUT OFF VALVE

[75] Inventor: Peter B. Olmsted, Traverse City, Mich.

[73] Assignee: Olmsted Products Company, Traverse City, Mich.

[22] Filed: Oct. 9, 1974

[21] Appl. No.: 513,216

[52] U.S. Cl. .............................. 137/493; 137/553
[51] Int. Cl.² ................... F16K 17/22; F16K 37/00
[58] Field of Search ...... 137/493, 106, 498, 516.25, 137/517, 553, 109, 110; 91/420, 437; 188/279, 280, 313, 314, 311

[56] References Cited
UNITED STATES PATENTS

| | | | |
|---|---|---|---|
| 2,410,984 | 11/1946 | Lawless | 137/553 X |
| 3,106,992 | 10/1963 | Sherburne | 188/279 |
| 3,255,850 | 6/1966 | Gray | 188/280 |
| 3,552,433 | 1/1971 | Mason | 137/553 |
| 3,561,574 | 2/1971 | Dickinson, Jr. | 137/109 |
| 3,602,104 | 8/1971 | Stremple | 91/446 |
| 3,739,808 | 6/1973 | Landherr | 137/493 |
| 3,760,840 | 9/1973 | Gates | 137/493 |

*Primary Examiner*—Martin P. Schwadron
*Assistant Examiner*—Robert J. Miller
*Attorney, Agent, or Firm*—James M. Deimen

[57] ABSTRACT

A novel emergency flow shut off device for fluid control systems particularly adapted for use in adverse marine environments. In normal operation the valve spool is continuously exercised by a reversing fluid pressure differential as fluid reversibly flows through the valve. External means are provided to conveniently monitor movement of the spool and thereby assure that the spool is free to shut off flow in a sudden emergency. Fluid cushioning means are provided at the end of the spool emergency shut off stroke to prevent damage to the valve. In a typical application the vertical motion of an offshore drill ship on the ocean swells causes oscillating flow in the fluid control system thereby automatically exercising the valve.

23 Claims, 5 Drawing Figures

FLOW SHUT OFF VALVE

BACKGROUND OF THE INVENTION

Shipboard fluid control systems are subjected to a severe corrosive environment. In the particular case of offshore drill ships fluid control systems are incorporated in the support structure for the riser pipe, a typical riser extending five hundred to three thousand feet beneath the ship and supported by riser cables extending downwardly from the ship. As the ship rises and falls on the ocean swells the support structure must be free to extend and contract smoothly. Typically a large hydraulic cylinder (18 inches in diameter, 16 feet of piston travel) connects each riser cable to the ship. A hydraulic circuit connects the cylinder to a gas pressurized accumlator. The weight of the riser results in the storage of sufficient potential energy in the cable and fluid control system to cause heavy damage to the ship and hazard to personnel upon cable breakage or other accident.

Emergency flow shut off devices are provided in the fluid circuit to prevent destruction of the hydraulic cylinder and accumulator. The devices prevent movement of hydraulic fluid thereby locking the fluid circuit and retaining the potential energy stored therein for subsequent controlled release. Such prior are devices require that the drilling operation be suspended while the devices are tested. There is no assurance that the devices are always operable between tests. The seriousness of the hazard upon failure of a prior art device during an emergency has led to the features of the present invention as disclosed below.

Other flow shut off or retardation devices are exemplified by U.S. Pat. Nos. 3,760,840; 3,561,574; 3,106,992; 3,255,850; and 3,739,808. These devices are directed to the control of fluid systems having different properties from that or riser support structures but are illustrative of the prior art.

SUMMARY OF THE INVENTION

The new flow shut off valve incorporates means to continuously exercise the spool of the valve in response to a reversing fluid pressure differential caused by a reciprocating flow of fluid. In the case of the preferred embodiment described below the reciprocating flow occurs in the fluid controlled riser support structure of an offshore drill ship. The valve allows fluid flow therethrough under normal operating conditions as the spool is partially displaced axially in either direction about a neutral position. External indicator means are provided to allow convenient monitoring of the valve spool movement as it is exercised thereby assuring operability in the event of emergency and eliminating periodic shutdowns of the drilling rig to test each valve for operability. Emergency conditions are transmitted to the valve by a sudden fluid pressure differential in excess of that normally occurring. The valve spool is driven forcefully to an extreme position thereby shutting off flow therethrough and locking the fluid circuit to prevent damage. Fluid cushioning means are provided at the end of the spool emergency shut off stroke to prevent damage to the valve.

DESCRIPTION OF THE PREFERRED EMBODIMENT

Figure 1:
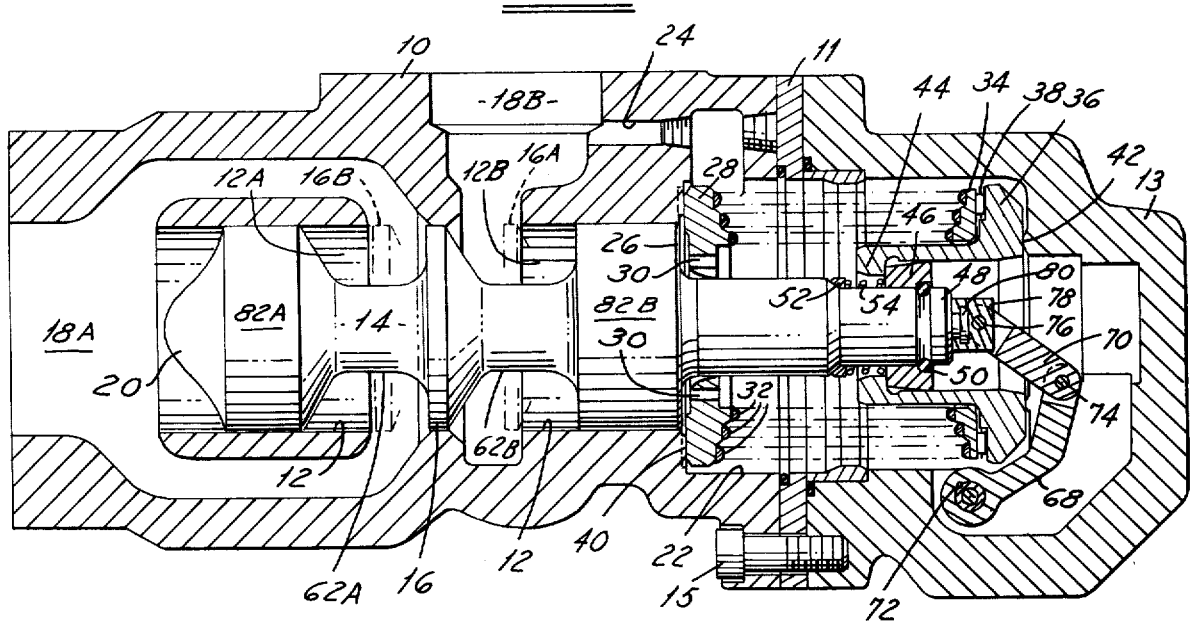
FIG. 1 is a side cross section of a valve embodying the invention taken along the line 1—1 in FIG. 2.
Figure 2:
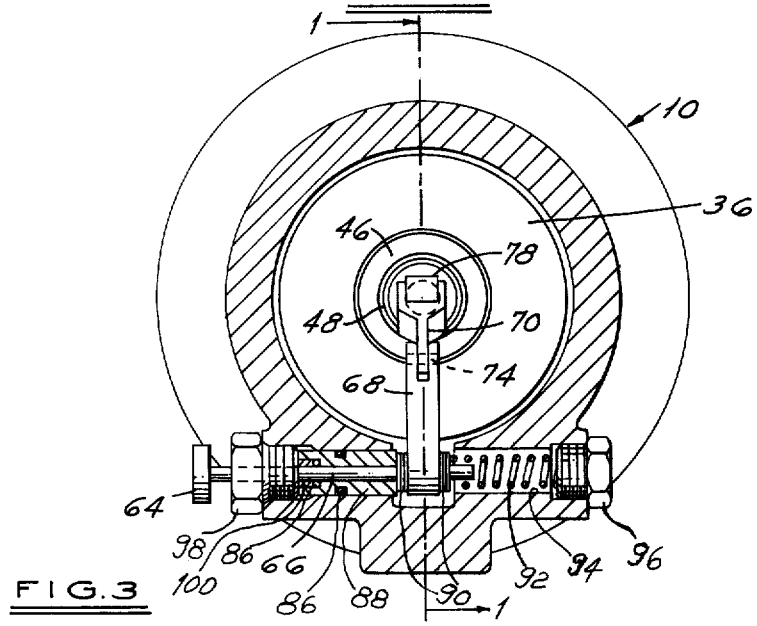
FIG. 2 is a cutaway end view of the valve disclosing the indicator linkage.

In FIGS. 1 and 2 the flow shut off valve comprises a body 10 of a suitable material such as ductile iron. The body 10 includes a sandwich plate 11 and cap 13 fastened together by a plurality of screws 15. A central bore 12 forms a chamber having a spool 14 slideably inserted therein. The spool 14 includes a central flange 16 which divides the chamber 12 into two portions 12A and 12B and substantially prevents fluid communication therebetween when the spool 14 is in the neutral position as shown in FIG. 1. Communicating with chamber 12A is fluid port 18A and communicating with chamber 12B is fluid port 18B. Fluid port 18A is also in communication with the end 20 of the spool 14. The chamber 12 includes an enlarged portion 22 in fluid communication through the passage 24 with port 18B. The spring retainer 28 in chamber portion 22 includes holes 30 to allow fluid contact with the end 26 of the spool 14.

The spring retainer 28 engages a plurality of concentric coil springs 32 which in turn engage a spring seat 34. The spring seat 34 engages a seat 36 through a thrust bearing 38. The spring retainer 28 and seat 36 respectively engage shoulders 40 and 42 of the enlarged portion 22 to thereby retain the springs 32 in a partially compressed condition. The seat 36 includes a central annular portion and internal flange 44 adapted to engage a retainer 46 in turn mounted on the spool extension 48 and retained by a segment ring 50. A collar 52 and spring 54 assure that the retainer 46 remains engaged with the segment ring 50 during reciprocating movement of the spool 14.

As shown in FIG. 1 the coil springs 32 retain the spool 14 in the neutral position. A fluid pressure differential occurring between the ports 18A and 18B, however, will displace the spool from the neutral position allowing fluid communication between ports 18A and 18B and compressing coil springs 32.

Figure 3:
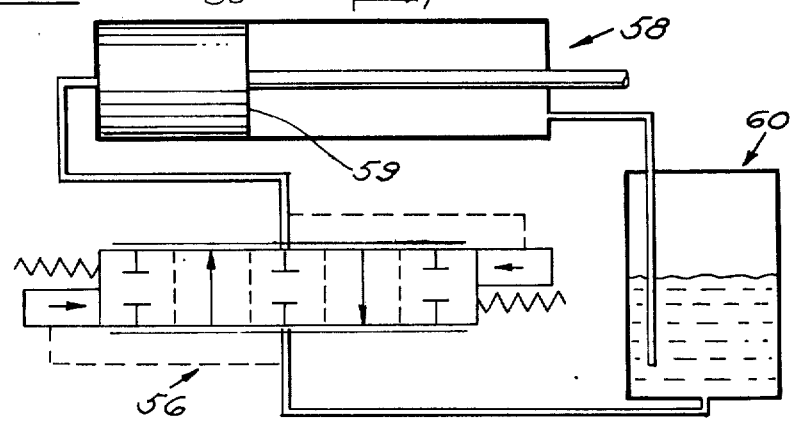
FIG. 3 is a schematic fluid circuit incorporating the valve.

Referring to FIG. 3 the valve is shown schematically at 56 connected to a fluid circuit comprising a hydraulic cylinder 58 and gas pressurized accumulator 60. Typically, the hydraulic cylinder 58 is attached mechanically to the hull of a drill ship (not shown) and the piston 59 to a riser support cable (not shown). The accumulator is pneumatically connected to a source of compressed air or other gas in additional gas bottles (not shown). In response to the rise and fall of the ship on the ocean swells, the piston 59 in the hydraulic cylinder 58 reciprocates and a reversing fluid pressure differential occurs between the ports 18A and 18B. In response thereto the spool 14 is caused to reciprocate between the positions shown ghosted at 16A and 16B by the reversing differential fluid force occurring between the spool ends 20 and 26 thereby allowing fluid communication between the ports 18A and 18B by way of the neck portions 62A and 62B of the spool 14. The fluid circuit thereby performs as a fluid spring attached to the riser cable.

The continuous reciprocating movement of the spool 14 in response to the ocean swells assures that the spool is continuously exercised and properly operating in the hostile marine environment. As shown in FIG. 1 movement of the spool 14 to the right in response to increased pressure at port 18A causes end 26 to move spring retainer 28 to the right. Movement of the spool 14 to the left in response to increased pressure at port 18B causes the retainer 46 to move the seat 36 and spring seat 34 to the left thus exercising the entire assembly.

To assure proper operation is occurring by convenient and continuous visual means, an external indicator 64 mounted on a transverse shaft 66 is connected by linkage arms 68 and 70 to the spool extension 48. Arm 68 is keyed to shaft 66 at 72 and dowel pins 74 and 76 join arm 70 to arm 68 and jaw 78 respectively. Jaw 78 in turn engages head 80 on the spool extension 48. Fluid sealing means for the shaft 66 include O-rings 86 fitted in the spacer 88. Thrust bearings 90 are mounted on the shaft 66 to separate the arm 68 from the spacer 88 and spring 92. The cross bore 94 includes threaded plugs 96 and 98 at each end thereof with the shaft 66 passing through plug 98 and bushing 100. Thus the reciprocating movement of the spool 14 causes a reciprocating movement of the indicator 64 which can easily be observed. Obviously, other mechanical or electronic transducer means may be substituted for the indicator.

Under normal operation the spool 14 reciprocates as described above to provide alternating fluid communication past the spool necks 62A and 62B thereby allowing smooth reciprocating movement of the piston 59 in the cylinder 58. However, due to the weight of the riser and associated equipment, the entire riser support system and fluid circuit of FIG. 3 retain sufficient potential energy to do severe damage to the drill ship upon sudden accidental release. Riser cable breakage or other accident can cause sudden destructive acceleration of the piston with explosive force if left unchecked.

Figure 4:
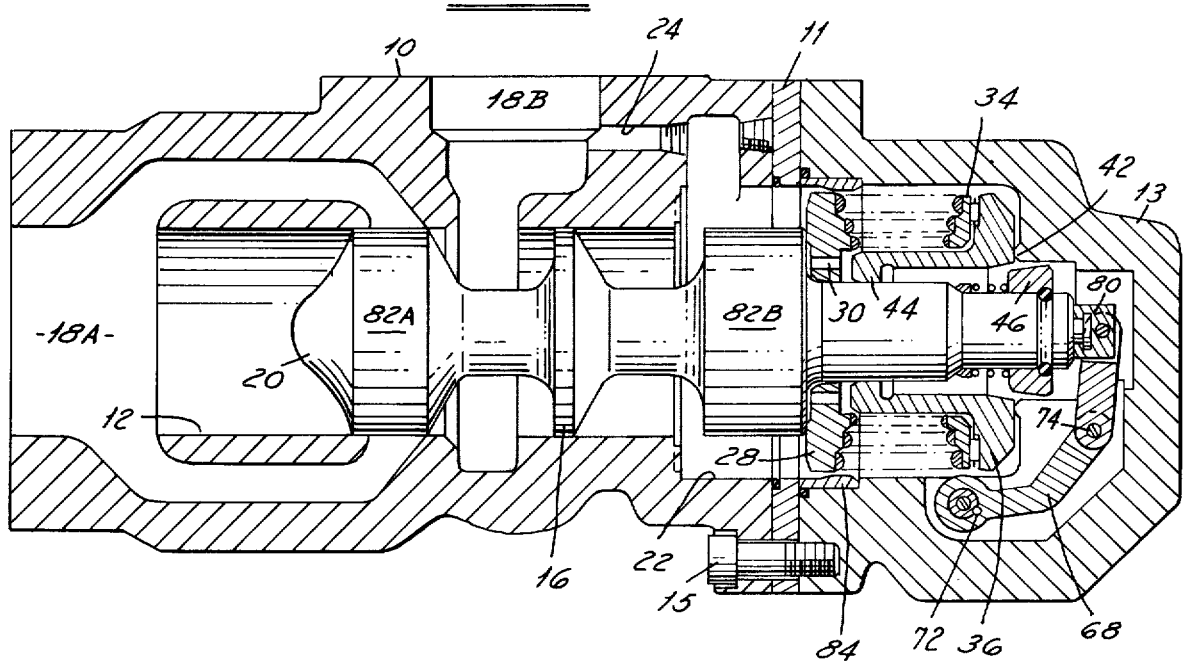
FIG. 4 is a side cross section of the valve in emergency shut off condition; and, FIG. 5 is a side cross section of the valve in alternate emergency shut off condition.
Figure 5:
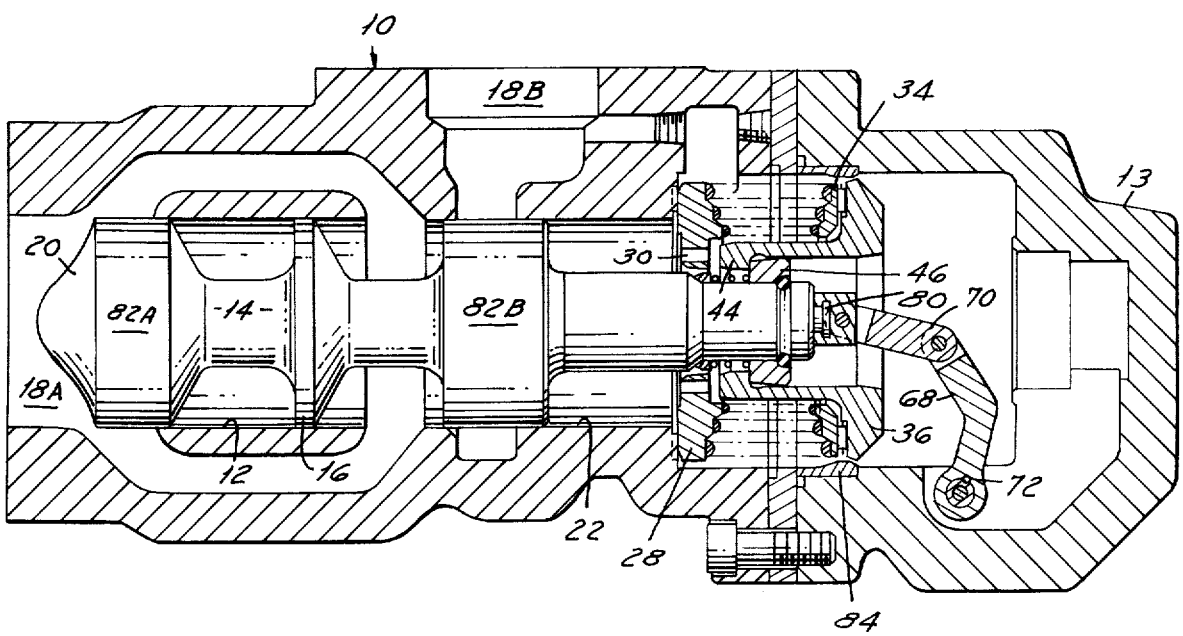

A sudden acceleration of the piston 59 in either direction causes increased fluid flow through the valve which in turn causes a fluid pressure differential between ports 18A and 18B in excess of the normally occurring pressure differentials. The spool 14 is thereby driven to one of the alternative extreme shut off positions shown by FIG. 4 or FIG. 5 depending upon the direction of movement of the piston 59. In FIG. 4 a sudden excess pressure at port 18A causes the spool 14 to be forcefully driven to the right and the enlarged portion 82A of the spool to close the port 18A. Alternatively, a sudden excess pressure at port 18B causes the spool 14 to be forcefully driven to the left and the enlarged portion 82B of the spool to close port 18B as shown in FIG. 5. The closure of ports 18A or 18B effectively locks the fluid circuit of FIG. 3 and prevents the uncontrolled release of potential energy stored therein. The valve remains shut off until the excess pressure differential is relieved by other means (not shown) in a controlled manner.

To prevent damage to the valve under emergency conditions a throttling sleeve 84 is positioned in the enlarged portion 22 of the chamber 12. As shown in FIG. 4 the sleeve 84 coacts with the spring retainer 28 to provide an annular orifice thereby throttling the flow of hydraulic fluid from the chamber portion at the right of the retainer 28 and bringing the spool 14 to a cushioned stop at the end of the shut off stroke. Similarly, in FIG. 5 the sleeve 84 coacts with the seat 36 to provide an annular orifice thereby throttling the flow of hydraulic fluid to the chamber portion at the right of the seat 36 and bringing the spool 14 to a cushioned stop at the end of the shut off stroke.

A sample of the valve having 3 inch diameter spool and chamber operates with a normal reciprocating pressure differential of about 50 psi and emergency shut off pressure differential above 60 psi. The springs 32 are compressed to 277 pounds force in the neutral position of FIG. 1 thereby providing a differential pressure of about 40 psi for breakaway from the neutral position.

The continuous exercising of the valve under normal operating conditions assures operability under emergency conditions. The complete shut off of the valve can be monitored also by the position of the indicator.

I claim:

1. Fluid control means comprising a body, a chamber in the body, at least two external ports communicating with the chamber, a spool in the chamber adapted to reciprocate about a neutral position located between the two external ports in response to reversing fluid pressure differentials occurring between the two ports and acting upon the spool thereby displacing the spool to permit fluid communication between the two external ports and exercising the spool to assure operability of the spool in the event of emergency, shut off means on the spool actuateable by the spool to substantially prevent fluid communication between the two ports in response to a fluid pressure differential in excess of the reversing fluid pressure differentials, and, means adapted to provide a cushioned halt to the movement of the spool upon complete shut off.

2. The fluid control means of claim 1 wherein the cushioning means are fluid throttling means.

3. The fluid control means of claim 2 wherein the fluid throttling means comprise a circumferential sleeve in the body and means actuated by the spool to coactingly provide an annular orifice.

4. Fluid control means comprising a body, a chamber in the body, at least two external ports communicating with the chamber, a spool in the chamber adapted to reciprocate about a neutral position located between the two external ports in response to reversing fluid pressure differentials occurring between the two ports and acting upon the spool thereby displacing the spool to permit fluid communication between the two external ports and exercising the spool to assure operability of the spool in the event of emergency, shut off means on the spool actuateable by the spool to substantially prevent fluid communication between the two ports in response to a fluid pressure differential in excess of the reversing fluid pressure differentials, and, means substantially preventing fluid communication between the ports with the spool in the neutral position and allowing communication with the spool displaced therefrom.

5. The fluid control means of claim 4 wherein the means preventing fluid communication include a flange on the spool.

6. The fluid control means of claim 5 wherein the spool includes enlarged portions spaced on either side of the flange, each capable of substantially shutting off communication between the two ports in response to a fluid pressure differential in excess of the reversing fluid pressure differentials.

7. The fluid control means of claim 4 including indicator means adapted to monitor movement of the spool.

8. The fluid control means of claim 7 wherein the indicator means include a mechanical linkage connected to the spool and extending exteriorly of the body.

9. The fluid control means of claim 4 including means biasing the spool to the neutral position.

10. The fluid control means of claim 9 wherein the biasing means include springs.

11. A fluid control system comprising a fluid cylinder and piston therein, fluid valve means in communication with the cylinder, exerciseable spool means in the fluid valve means adapted to reciprocate about a neutral position in response to a reversing fluid flow caused by reciprocation of the piston, fluid accumulator means in communication with the fluid valve means, the reciprocation of the exerciseable spool means permitting reversible fluid flow between the cylinder and accumulator, and, wherein the exerciseable spool means include means to prevent fluid flow through the fluid valve means with the exerciseable spool means in the neutral position.

12. The fluid control system of claim 11 wherein the exerciseable spool means include shut off means to substantially prevent fluid flow between the cylinder and accumulator in response to a sudden acceleration of the piston in the cylinder.

13. The fluid control system of claim 11 wherein the exerciseable spool means include shut off means to substantially prevent fluid flow between the cylinder and accumulator in response to an excess pressure differential between the cylinder and accumulator.

14. Fluid control means comprising a body, a chamber in the body, at least two external ports communicating with the chamber, a spool in the chamber adapted to reciprocate about a neutral position located between the two external ports in response to reversing fluid pressure differentials occurring between the two ports and acting upon the spool thereby displacing the spool to permit fluid communication between the two external ports and exercising the spool to assure operability of the spool in event of emergency, shut off means actuateable by the spool to substantially prevent fluid communication between the two ports in response to a fluid pressure differential in excess of the reversing fluid pressure differentials, and, means adapted to provide a cushioned halt to the movement of the spool upon complete shut off.

15. The fluid control means of claim 14 wherein the cushioning means are fluid throttling means.

16. The fluid control means of claim 15 wherein the fluid throttling means comprise a circumferential sleeve in the body and means actuated by the spool to coactingly provide an annular orifice.

17. Fluid control means comprising a body, a chamber in the body, at least two external ports communicating with the chamber, a spool in the chamber adapted to reciprocate about a neutral position located between the two external ports in response to reversing fluid pressure differentials occurring between the two ports and acting upon the spool thereby displacing the spool to permit fluid communication between the two external ports and exercising the spool to assure operability of the spool in the event of emergency, shut off means actuateable by the spool to substantially prevent fluid communication between the two ports in response to a fluid pressure differential in excess of the reversing fluid pressure differentials, and, means substantially preventing fluid communication between the ports with the spool in the neutral position and allowing communication with the spool displaced therefrom.

18. The fluid control means of claim 17 wherein the means preventing fluid communication include a flange on the spool.

19. The fluid control means of claim 18 wherein the spool includes enlarged portions spaced on either side of the flange, each capable of substantially shutting off communication between the two ports in response to a fluid pressure differential in excess of the reversing fluid pressure differentials.

20. The fluid control means of claim 17 including indicator means adapted to monitor movement of the spool.

21. The fluid control means of claim 20 wherein the indicator means include a mechanical linkage connected to the spool and extending exteriorly of the body.

22. The fluid control means of claim 17 including means biasing the spool to the neutral position.

23. The fluid control means of claim 22 wherein the biasing means include springs.

* * * * *